Reissued Dec. 7, 1943

Re. 22,401

UNITED STATES PATENT OFFICE 22,401

SOLVENT PRODUCTION

Jacquelin E. Harvey, Jr., Washington, D. C., assignor of one-half to Southern Wood Preserving Company, East Point, Ga., a corporation of Georgia No Drawing. Original No. 2,291,320, dated July 28, 1942, Serial No. 383,470, March 14, 1941. Application for reissue April 26, 1943, Serial No. 484,670

13 Claims. (Cl. 196—53)

The present invention relates to the production of solvents from tars and fractions thereof of aromatic content.

This application is a continuation in part of my application Serial No. 345,436, filed July 13, 1940, for Production of an article of commerce, copending herewith, as to all matter common to the two applications.

An object of the present invention is the conversion of tars and/or fractions thereof of aromatic content into solvents and/or plasticizers.

Another object of the present invention is the conversion of mixtures of tar fractions, while under influence of a catalyst, said catalyst having at least partial sulfide content, into solvents and/or plasticizers.

Yet another object of the present invention is the substantially total conversion of a mixture of tar fractions, by aid of catalysis, into solvents and/or plasticizers, said conversion characterized by provision of conditions that maintain said catalysis at substantially optimum conditions.

Other objects of the present invention will become apparent from the following disclosures.

Usable starting materials of the present process include tars or fractions thereof, characterized by aromatic content. Said tars include destructive distillation products of coal, as for instance, high temperature coke oven tar, low temperature tar and gas house tar; aromatic extracts of coal and petroleum; high boiling aromatic hydrocarbons produced by polymerization of petroleum or fractions thereof, including gas and gases.

The present process provides a method for the conversion of tar/or fractions thereof, said tar and fractions thereof being characterized by the presence of a multiplicity of rings, into solvents and/or plasticizers of superior aromaticity.

By the terms "multiplicity of rings," "ring multiples," or "molecular complexes" are meant those high boiling fractions, including pitch or tar fractions of aromatic content that may be viewed as having little or no solvency or plasticity when compared to conventional low boiling solvents or commercial plasticizers.

The molecular complexes necessitate step-wise treatment for conversion to the solvents and/or plasticizers of the present invention. By the term "step-wise" is meant that when converting substantially the entirety of starting material into the solvents and/or plasticizers of the present invention, said conversion is not effected in entirety by merely once impressing on the starting material the control variables of the present process, but rather is accomplished by repeatedly impressing the process controls, as hereinafter stated on said starting material. The unconverted portion approaches zero as representing a maximum conversion; that is to say, the process controls of the present process are impressed on the starting material for conversion of a percentage, but less than the whole, into solvents and/or plasticizers; after removal of said induced solvents and/or plasticizers by known methods, the unconverted portion, with or without addition of starting material to compensate for product recovery, is again subjected to process controls for induction of said products, etc.

Viewed broadly, the present invention provides a process wherein the starting materials are subjected to the action of hydrogen, under catalyzed conditions characterized by said catalysis being maintained at optimum conditions by specific provision, whereby to convert said starting material in aforesaid step-wise manner into solvents and/or plasticizers. The process of the present invention is further characterized by being practiced in the liquid phase, as opposed to vapor phase that vaporizes substantially the entirety of the feed stock. The term "liquid phase" may not be technically correct, inasmuch as varying amounts of the starting feed are vaporized; however, there is a definite line of demarcation between the liquid phase herein used and the commonly accepted vapor phase.

Among other things, the liquid phase hydrogenation of the present process is employed for the following reason: that maintenance of liquid phase makes possible continued step-wise conversion to the end that substantially volume for volume conversion be effected.

The following examples will serve to illustrate modes of practicing the general principles upon which the practice of the present invention is based, as well as the process of the present invention.

*Example 1.*—A coal tar fractions boiling substantially 3% at 380° C. was passed through a high pressure reaction vessel while contacting a sulphide catalyst and while simultaneously flowing hydrogen therethrough, at a pressure of 300 atmospheres and a temperature of 410° C. Time of reaction one and one-half hours. The beneficiated material was found to have an initial boiling point of substantially 150° C. and was distilled to an upper limit of 200° C. to recover the distillate as a solvent of superior quality, that is to say, a solvent of substantially 50% aromatic content, or more. The residue resulting from said distillation was fed back to the reaction vessel with crude starting material.

At the end of the 36th hour of operation the synthesis of the solvent had declined. Research disclosed that the reason therefor was apparent at least partial conversion of the sulphide catalyst into some other form. Identical operations were repeated using the same starting material, except that the feed was adjusted to contain one-half of one percent sulphur. On the repeating operations the percentage of solvent increment held constant, other than normal loss normally anticipated due to catalyst age. The beneficiated feed stock was stripped up to 200° C. for said solvent recovery and the residue therefrom being recycled to the end that substantially volume for volume of the starting material be converted, neglecting gasification and normal manufacturing loss, to the solvent specified.

Thus the present example illustrates a process for converting in step-wise manner, a mixture of tar fractions substantially in their entirety, into solvents of superior quality, characterized by said conversion being effected in liquid phase, and further characterized by maintenance, without substantial reduction, of original conversion ratio other than changes due to "straightening-out" or ageing of said sulphide catalyst.

Concerning the addition of sulphur to the feed stock, the sulphur content of the starting material, including recycle material, is adjusted to that sulphur content which will provide maintenance of the catalyst in substantial sulphide form. Thus, forming an important part of the present invention is the maintenance of a hydrogen sulphide partial pressure of at least a fractional atmosphere, or as high as one atmosphere, or higher. A few trials will readily disclose that hydrogen sulphide partial pressure that will maintain the catalyst in substantial sulphide form under given conditions.

Of course, the sulphur may be supplied in forms other than elemental sulphur. Sulphur may be added in any form capable of generating hydrogen sulphide to the end that the catalyst be maintained in substantial sulphide form.

Some tars, or fractions thereof, including aromatic extracts of petroleum or petroleum fractions and polymerization products thereof, may have sufficient sulphur or sulphur compound therein to obviate the necessity of sulphur addition.

Thus, it will be seen that the invention provides a process for the conversion, substantially volume for volume, of a mixture of tar fractions into solvents of superior quality, said conversion being characterized by subjecting the starting material in liquid phase to the action of hydrogen and hydrogen sulphide, said hydrogen sulphide representing a partial pressure of at least a fractional atmosphere; said conversion being further characterized by the presence of a sulphide catalyst maintained in substantial sulphide form, the while catalyzing step-wise reduction to substantially total conversion as aforesaid.

*Example 2.*—Coal tar pitch boiling substantially 15% at 355° C. was passed through a high pressure reactor, while simultaneously flowing hydrogen therewith. Catalyst, molybdenum sulphide. Pressure 300 atmospheres and temperature 400° C. Hydrogen sulphide partial pressure 1 atmosphere and gas flow in excess of 4,000 cubic feet per barrel feed. Reaction time was 1 hour. The beneficiated material after being relieved of its dissolved and occluded gas was returned to the reaction system and treated under identical conditions, except the temperature was raised to 425° C. The twice beneficiated material was distilled to an upper limit of 290° C. to recover the solvent which had an overall aromaticity of more than 50% and distilled predominantly between 150° C. and 292° C. The solvent so produced may be fractionally cut to provide solvents of varied boiling ranges.

After the starting material has been subjected to the process controls for solvent induction, the point at which the fractional cut is made for solvent recovery is not an inflexible point, but is rather varied by desired end point of the recovered solvent. In the following tabular data are shown end points of various commercial solvents, substitutes for which may be provided by the induced solvents of the present process.

*Solvents*

| Identification: | End point, degrees C. |
|---|---|
| Benzol | 120 |
| Toluol | 150 |
| Hi-flash naphtha | 200 |
| Heavy naphtha | 290 |
| High boiling crudes and plasticizers | 360 |

Other end points may be provided.

When recovering the solvents of the present invention from the beneficiated material, as for instance, when recovering the solvent to an upper limit of 360° C., the fractional part boiling between (as an example) 300° C. and 360° C. may be used as a plasticizing oil, or the like because of induced characteristics.

*Example 3.*—Coal tar, boiling predominantly above 190° C. was subjected to the action of hydrogen and hydrogen sulphide at 400° C. for one half hour. Catalyst was molybdenum and tin sulphide, pressure 400 atmospheres and hydrogen sulphide partial pressure substantially 1½ atmospheres. The beneficiated material was then subjected to a second treatment under identical conditions, except that the temperature was raised to 450° C. and treatment continued for 1 hour. The beneficiated mass was then distilled to an upper limit of 290° C. to recover the solvent as a distillate. The residue therefrom was added to fresh starting tar and recycled; sulphur content being adjusted. The solvent so recovered had an aromaticity of greater than 50%.

*Example 4.*—It has been discovered that when subjecting certain mixtures of refined coal tar fractions to the action of hydrogen in accordance with the present process for the production of solvents and/or plasticizers that the formerly accepted teaching that product increment, depolymerization and/or hydrogen absorption are linear functions of the time, is not followed.

When subjecting a mixture of crude coal tar fractions boiling predominantly above 250° C. or 275° C. to the action of hydrogen, research has disclosed that the newly induced products, depolymerization and/or hydrogen absorption are linear functions of the time. As an example when the above mixture of crude coal tar fractions is subjected to the action of hydrogen for 2, 5-, and 8-hour periods, the newly induced products, depolymerization and/or hydrogen absorption are linear functions of the time element.

One of the preferred starting materials of the present process is a mixture of refined coal tar fractions boiling predominantly above 355 or 380° C. Such a starting material is conveniently the final residue resulting from evaporating coal tar to dryness or substantial dryness and then stripping wood preservative from the distillate. This final residue mass of refined tar fractions is an especially suitable refined coal tar pitch to be used as starting material of the present process. However, in contradistinction to the mixture of crude coal tar fractions boiling predominantly above 250 or 300° C., when the aforenamed preferred starting material is subjected to the action of hydrogen for production of solvents and/or plasticizers, the newly induced fractions, depolymerization and/or hydrogen absorption are not, as described for the other mixture of crude coal tar fractions, linear functions of the time. A critical period of treatment by or with hydrogen exists, and which if exceeded causes loss of newly induced fractions, polymerization and/or lessened hydrogen absorption on certain fractions of the preferred starting material under treatment.

The critical time element because of the obvious possible variations in the characteristics of the aforenamed refined coal tar pitch cannot be spoken of as an arbitrary figure. It can be stated, however, that if the refined pitch were to be subjected to the action of hydrogen for such a length of time, which for the other crude tar fractions would illustrate that the newly induced fractions, depolymerization and/or hydrogen absorption were linear functions of the time element, loss of induced products, polymerization and/or lessening of hydrogen absorption would occur. When treating the refined coal tar pitch by or with hydrogen, the critical time element is in the order of about three hours.

In the disclosures made herein and in the appended claims distillate removal of low boiling portions from the beneficiated material is considered and the equivalent of fractional removal by gas movement, solvent action or the like. The converse also obtains.

In accordance with the present process the refined pitch is passed through a high pressure reaction vessel while simultaneously flowing hydrogen and hydrogen sulfide therewith; catalyst molybdenum sulfide and time of contact two hours; hydrogen flow 15,000 cubic feet per barrel feed stock; total pressure 500 atmospheres.

The beneficiated refined coal tar pitch is characterized by lowered specific gravity, viscosity and coke residue, and the high boiling fraction relatively susceptible to thermal degradation will, at least to a degree, be rendered thermally stable. Too, the beneficiated material as flowing from the period of hydrogen action specified will provide conformance to the accepted teaching that the newly induced fractions, depolymerization and/or hydrogen absorption are linear functions of the time element, whereas if an attempt were made to secure additional increment of newly induced fractions, depolymerization and/or hydrogen absorption by an extended period of time, as for instance in excess of about three hours, the newly induced fractions, depolymerization and/or hydrogen absorption would not be linear functions of the time element. Among other things, there would be an actual loss of newly induced fractions. The beneficiated material is distilled to an upper limit of, as an example, 360° C. to recover as distillate the fraction boiling below 300° C. as a superior solvent having at least in the order of 50% ring structures, and the fraction 300–360° C. characterized by preponderance of ring structures and having for certain purposes plasticizing properties induced therein by the process. In lieu of recovering the plasticizer as a distillate, it may be recovered as a residue incidental to the recovery of the aforementioned solvent, which, if desired may be fractionated to recover superior solvents of various boiling ranges. In recovering the plasticizer as a residue, the plasticizer represents as an example, the entirety of the beneficiated refined coal tar pitch boiling above 300° C.

Another variation of practicing utilization of the refined coal tar pitch is first depolymerizing it, at least to a degree by use of a solvent of aromatic content as for instance one having an aniline point of not in excess of 50° C. Small amounts of solvents are helpful, and up to volume for volume, or more, may be employed. Thereafter the solvent and solute are subjected to the action of hydrogen in accordance with the present process.

When subjecting the refined pitch to the action of hydrogen in the presence of a sulfide catalyst, unless there is maintained a hydrogen sulfide partial pressure in the order of at least a fractional atmosphere reaction conditions are not sustained, but are characterized by a diminution.

Yet another variation of the process that utilizes the refined coal tar pitch having a critical time element as explained in the foregoing, is to separate the material into narrow boiling cuts, and then with or without employment of a solvent as aforedescribed, subject the narrow boiling fractions to the action of hydrogen in accordance with the process. The narrow boiling cuts may be provided having, as an example, a range of 20° C., or more. If desired, following the hydrogen action any desired form of chemical refining may be employed.

In order to preclude undesired reactions when treating the refined pitch, hydrogen flows are held in excess of 3000 cubic feet per barrel of material treated.

The liquid phase of the present invention, as heretofore explained, is used for the reason that only in liquid phase can step-wise reduction of substantially volume for volume of the starting material be effected to solvents of superior solvency.

Continuous or bath methods may be used. In the event continuous conversion is practiced, conversion may be effected in a single reactor, a series of reactors, a parallelism of reactors, including a multiplicity thereof. When practicing continuous methods wherein hydrogen or hydrogen-containing gas flows in a stream, varying amounts of said gas may be used, dependent upon results desired. However, the flow of gas is always held, at least, slightly in excess of that amount which induces appreciable carbonaceous increment, which increment is, however, not to be confused with that carbonaceous increment that is inherent to the process and which usually causes plant shut-down, as an example, every 3 to 6 or 9 months, or longer. The gas flow, using average tars, or fractions thereof, is desirably held in excess of 3,000 cubic feet per barrel material treated.

By the term "beneficiated" as used herein and in the appended claims is meant starting material at least once subjected to the action of hydrogen.

Tar, or fractions thereof, that have had their carbon content lowered are especially adapted to be used as starting materials of the present process, and the claims are to be read with this disclosure in mind. The terms "tar" and "tar fractions" as used herein and in the appended claims are meant to cover said tar and/or tar fractions up to substantially the time of actual conversion into solvents of the present invention.

The process variables are adapted to various coordinations to produce low boiling solvents and/or high boiling solvents. Excessive time element may be substituted for increased temperatures in some cases when producing additional solvent increment and/or lower boiling ends.

As is well known, hydrogenations proceed at moderate temperatures and pressures; however, to approximate commercial necessities, elevated temperatures and pressures are desirable. Temperatures as low as 250° C. and pressures as low as 50 atmospheres are usable; however, with catalysts now commercially available, the necessity of inordinately long periods of treatment makes higher temperatures and pressures desirable. With pressures of 200 atmospheres and above, and temperatures of 375° C. and above, when converting as aforenamed in said catalyzed manner, good results have been obtained.

However, as mentioned in the foregoing a control of process variables is desired that causes no coking.

Catalysts assist in speeding and directing the desired reactions of the process of the present invention. All hydrogenating catalysts of sulphide form are usable. However, catalysts other than of sulphide form may be provided, with subsequent conversion to the sulphide or partially sulphide form due to the action of supplied hydrogen sulphide. Various catalysts in conjunction with those aforementioned may be used, such as various shapes; deposited in well known manner on carriers; cobalt, tin, vanadium, molybdenum, chromium, tungsten, or their compounds; promoted or not; in admixture if desired, with or without small amounts of acid, acids, halogen or derivatives of halogens; all sulphide catalysts of hydrogenating efficacy, in the form of shapes, pellets, extruded lengths, comminuted, with or without the presence of other materials possessing hydrogenating properties, or not; such as asbestos, quartz, earths, lumps of brick, etc.

By the term "superior solvency" as used herein and in the appended claims is meant that the solvents of the present process are of greater solvency than hydrocarbon solvents commercially available, and have, among other things, an aromaticity of in the order of 50%, or greater.

When adjusting the sulphur content of the feed stock, including recycle material, so as to provide that hydrogen sulphide partial pressure necessary for maintenance of at least a portion of the catalyst in sulphide form, the sulphur may be added as elemental sulphur, or any form of sulphur capable of providing aforesaid requirement. Some of the feed stocks may, however, contain sufficient sulphur without addition thereto.

At times when using as starting material tar fractions that contain a large percentage of molecular complexes, it may be desirable to at least partially depolymerize said molecular complexes by addition of a solvent thereto.

From the foregoing disclosure it will be seen that the present process provides a method for converting tar, or fractions thereof, into solvents, said conversion being characterized by subjecting said tar, and/or fractions thereof, while in liquid phase in the presence of a sulphide catalyst to the action of hydrogen and hydrogen sulphide with time, temperature and pressure so controlled as to produce solvent increment, and recovering from the beneficiated material a solvent having an aromaticity of in the order of 50% or greater.

The evaluation of solvent power is conveniently accomplished by finding the well-known aniline point of kauri-butanol number. The evaluation of plasticizing properties is conveniently accomplished by recourse to methods suggested in chapter VI, "The technology of solvents" by Dr. Otto Jordon, Mannheim, Germany, translated by Alen D. Whitehead, Chemical Publishing Company of New York, Incorporated, New York, New York.

Minor changes may be made in the details of the foregoing without departing from the spirit of the invention.

I claim:

1. In the production of a solvent from the refined pitch produced by stripping high temperature coal tar to at least about substantial dryness and fractionating the overhead material to recover a liquid useful as a wood preservative, and a higher boiling fraction boiling predominantly above 355° C., the process which comprises: subjecting said higher boiling fraction while contacting a sulfide catalyst to the action of hydrogen and hydrogen sulfide at a pressure and temperature in excess of about 200 atmospheres and 375° C., respectively, for a period not in excess of about three hours, whereby to avoid loss of newly induced fractions to provide a solvent.

2. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction, while contacting a sulfide catalyst, to the action of hydrogen and hydrogen sulfide for a period not in excess of about three hours, whereby to avoid loss of newly induced fractions; and fractionating the beneficiated material to provide low boiling fractions as a solvent.

3. The process of claim 2 with the inclusion of recycling the residue.

4. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction, while contacting a sulfide catalyst, to the action of hydrogen and hydrogen sulfide at a pressure in excess of about 50 atmospheres and a temperature in excess of about 375° C. for a period not in excess of about three hours, whereby to avoid polymerization, to produce a solvent.

5. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction, while contacting a sulfide catalyst, to the action of hydrogen and hydrogen sulfide at a temperature and pressure in excess of 250° C. and 50 atmospheres, respectively, for a period not in excess of about three hours, whereby to avoid lowered hydrogen absorption, to provide a solvent.

6. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction, while in the presence of a sulfide catalyst, to the action of hydrogen and hydrogen sulfide at a pressure and temperature in excess of 200 atmospheres and 375° C., respectively, for a period not in excess of about three hours, whereby to avoid loss of newly induced fractions, to produce a solvent.

7. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction, while contacting a sulfide catalyst, to the action of hydrogen and hydrogen sulfide for a period not in excess of about three hours, whereby to avoid loss of newly induced fractions; and fractionating the beneficiated material to provide low boiling fractions as a solvent.

8. The process of claim 7 with the inclusion of recycling the residue.

9. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction, while contacting a sulfide catalyst, to the action of hydrogen and hydrogen sulfide at a pressure and temperature in excess of about 200 atmospheres and 375° C., respectively, for a period not in excess of about three hours, whereby to avoid polymerization, to produce a solvent.

10. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction, while contacting a sulfide catalyst, to the action of hydrogen and hydrogen sulfide at a temperature and pressure in excess of about 250° C. and 50 atmospheres, respectively, for a period not in excess of about three hours, whereby to avoid lowered hydrogen absorption, to produce a solvent.

11. In the production of a solvent from the refined pitch produced by stripping high temperature coal tar to at least about substantial dryness, and fractionating the overhead material to recover a liquid useful as a wood preservative, and a higher boiling fraction boiling predominantly above 355° C., the process which comprises: subjecting said higher boiling fraction, while contacting a sulfide catalyst, to the action of hydrogen and hydrogen sulfide at a pressure and temperature in excess of about 200 atmospheres and 375° C., respectively, for a period not in excess of about three hours, whereby to avoid loss of newly induced fractions; and fractionating the beneficiated material to provide low boiling fractions as a solvent.

12. The process of producing a solvent which comprises: evaporating high temperature coal tar to at least about substantial dryness; fractionating the overhead material to recover a liquid useful as a wood preservative, and a higher boiling fraction boiling predominantly above 355° C.; and subjecting said higher boiling fraction, while contacting a sulfide catalyst, to the action of hydrogen and hydrogen sulfide at a pressure and temperature in excess of about 200 atmospheres and 375° C., respectively, for a period not in excess of about three hours, whereby to avoid loss of newly induced fractions; and fractionating the beneficiated material to provide low boiling fractions as a solvent.

13. The process of claim 12 with inclusion of recycling residue.

JACQUELIN E. HARVEY, JR.